May 2, 1939.  H. F. MAYNES  2,156,538
METHOD OF MAKING HEAT TRANSFER UNITS
Filed July 22, 1936  9 Sheets-Sheet 1
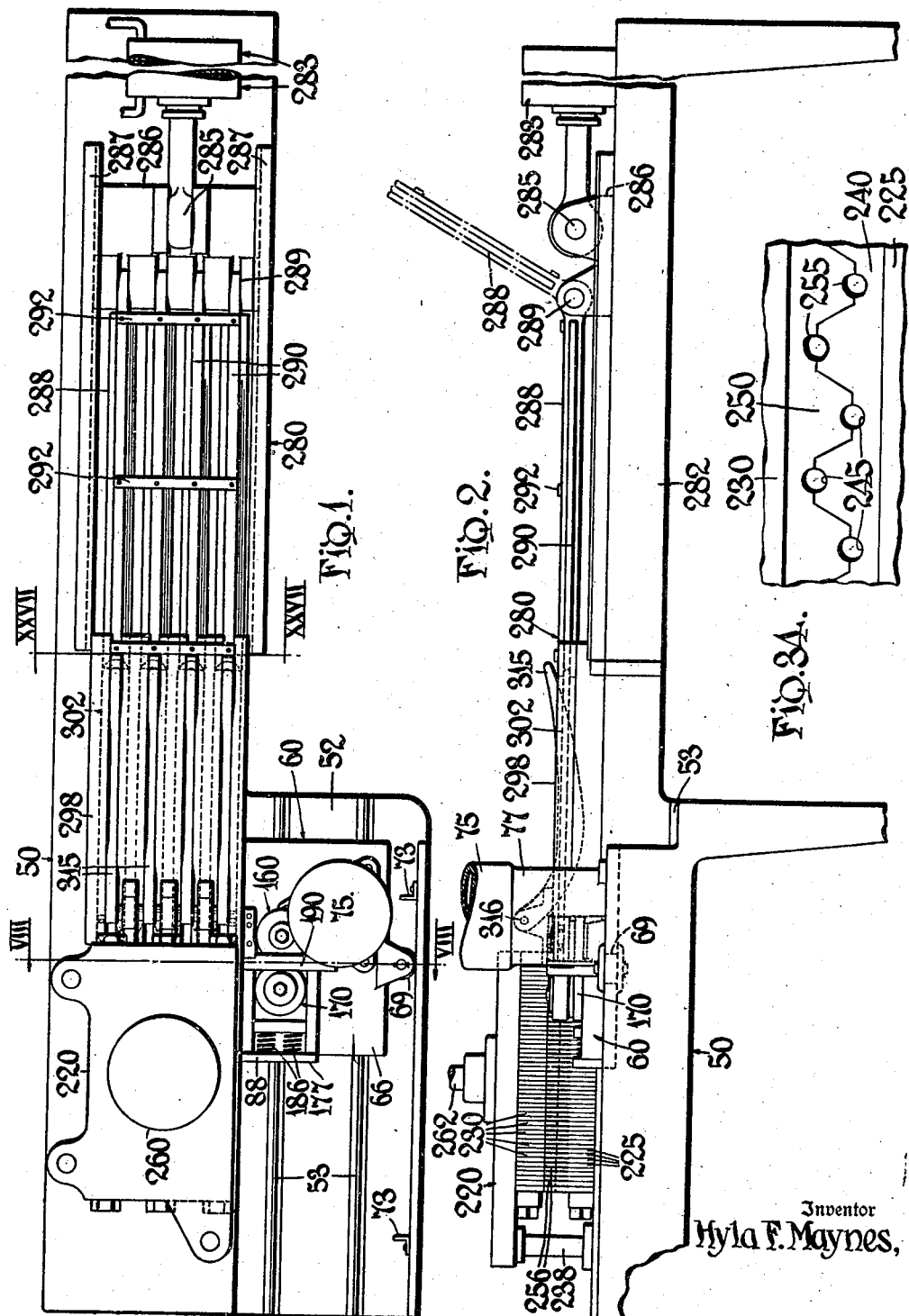
Inventor
Hyla F. Maynes,
Beau, Brooks, Buckley & Beau. Attorneys

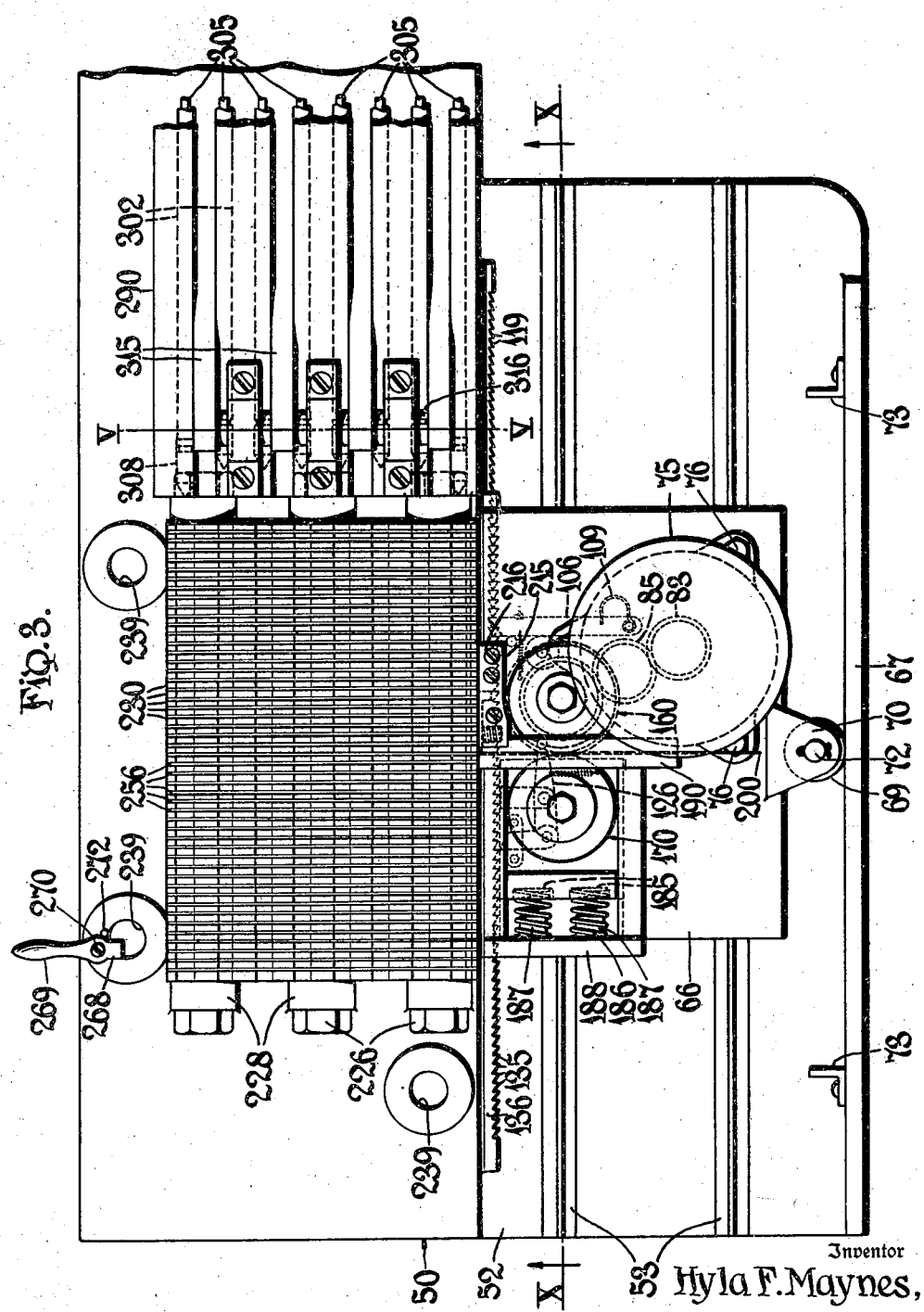

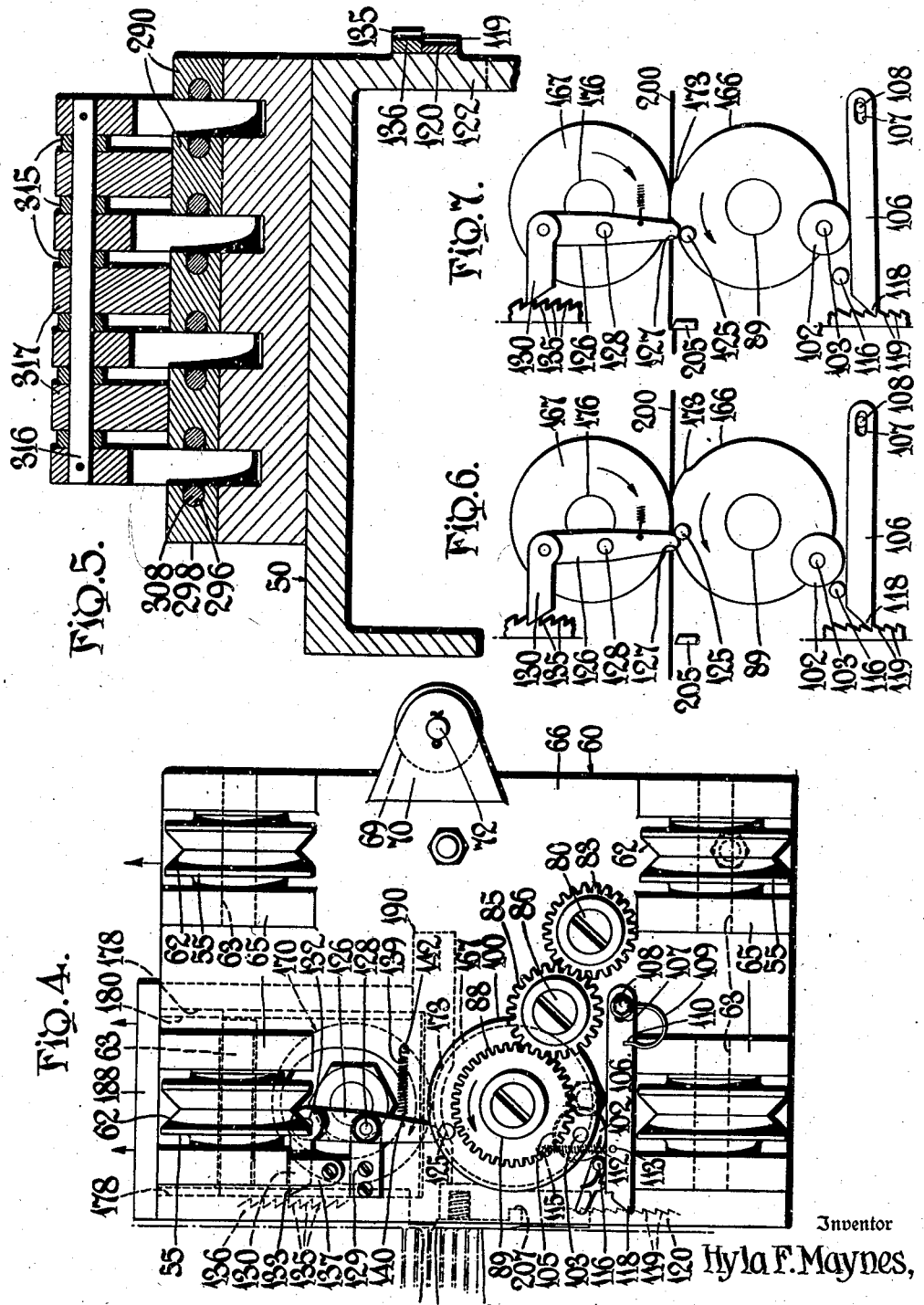

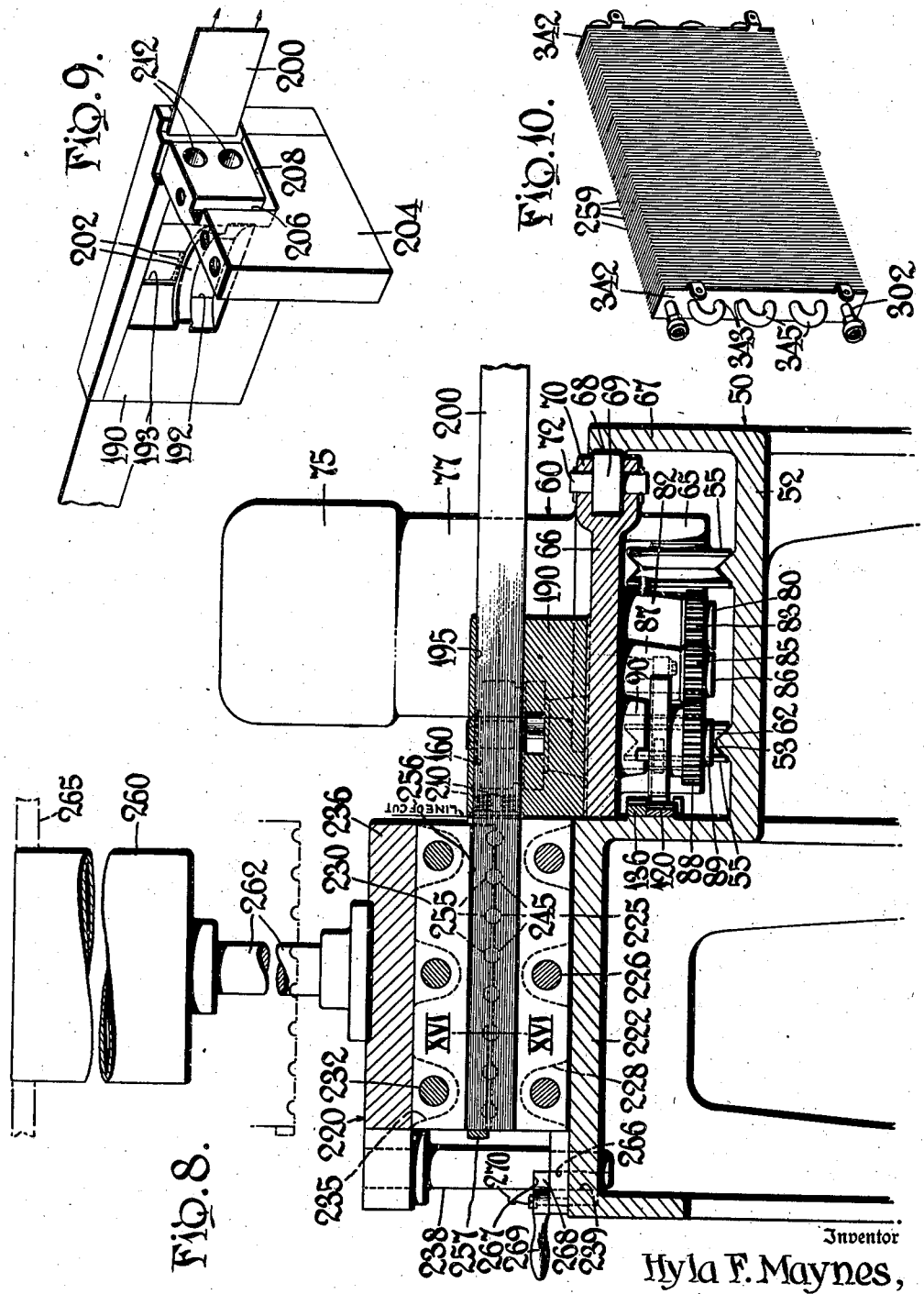

May 2, 1939.　　　　　H. F. MAYNES　　　　　2,156,538
METHOD OF MAKING HEAT TRANSFER UNITS
Filed July 22, 1936　　　9 Sheets-Sheet 5
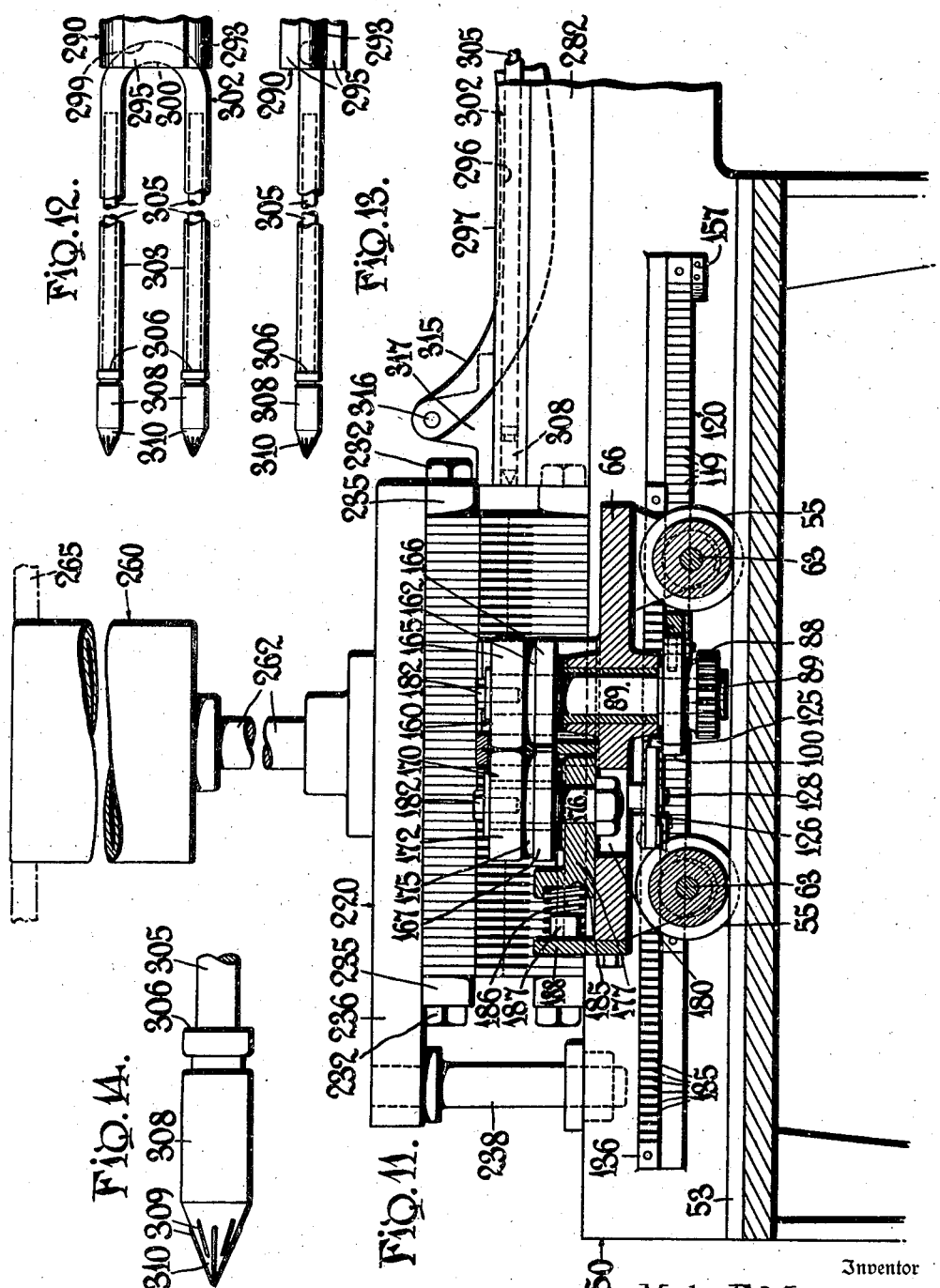
Inventor
Hyla F. Maynes,
Beau, Brooks, Buckley & Bean.
Attorneys

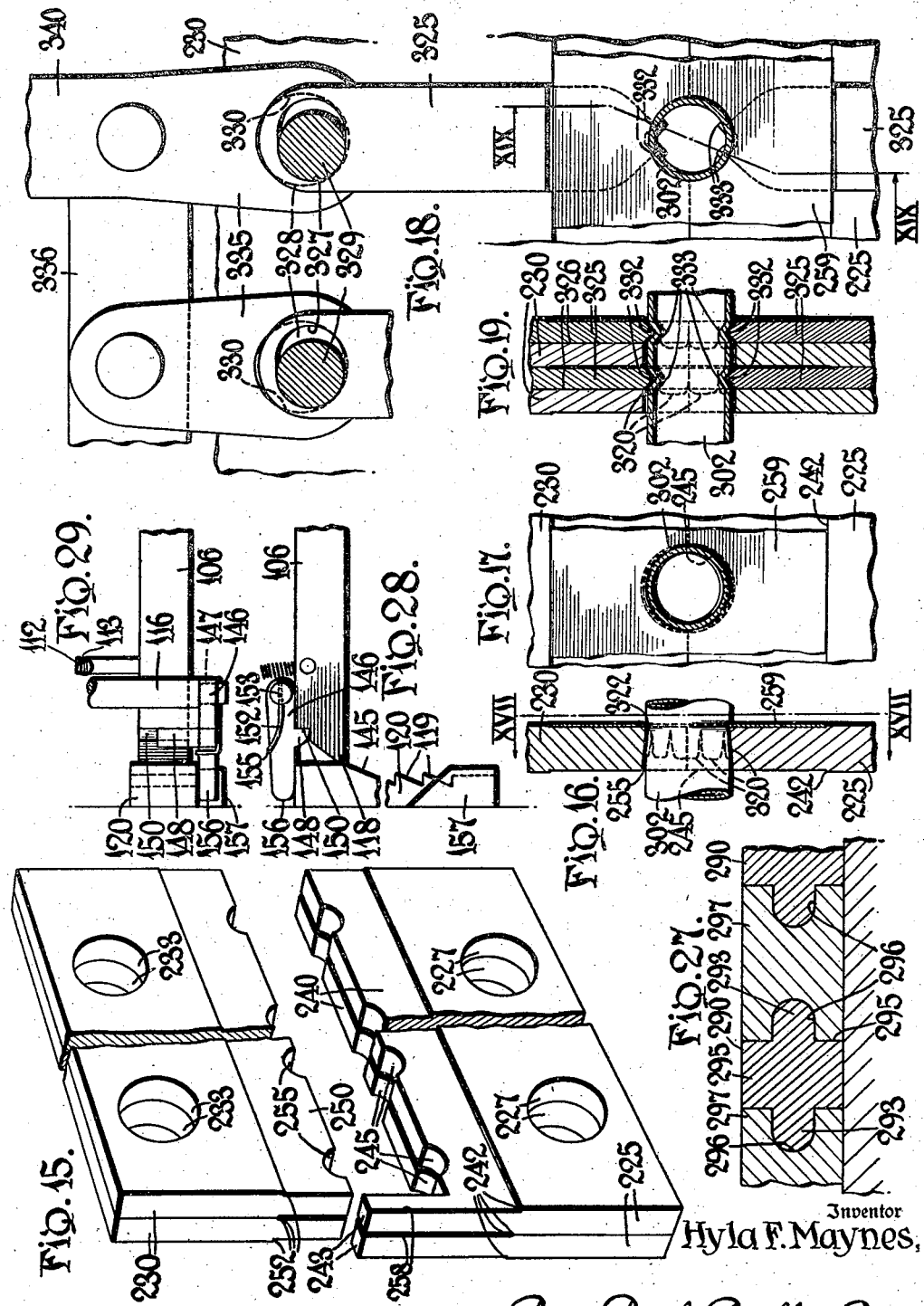

May 2, 1939.  H. F. MAYNES  2,156,538
METHOD OF MAKING HEAT TRANSFER UNITS
Filed July 22, 1936   9 Sheets-Sheet 7
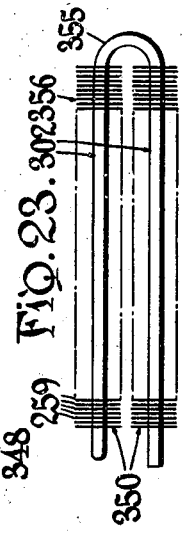
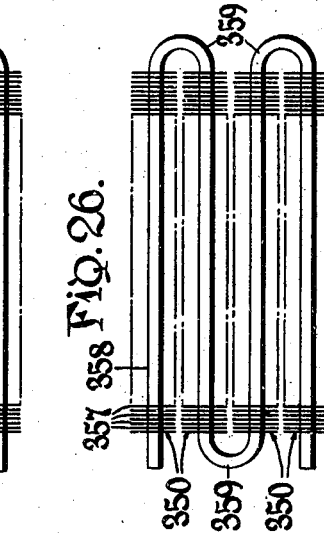
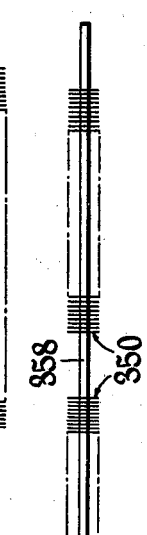
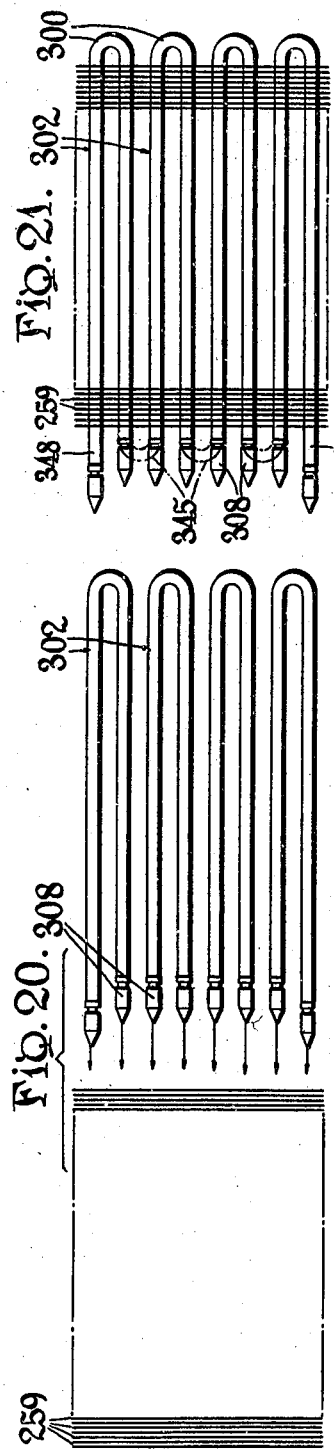
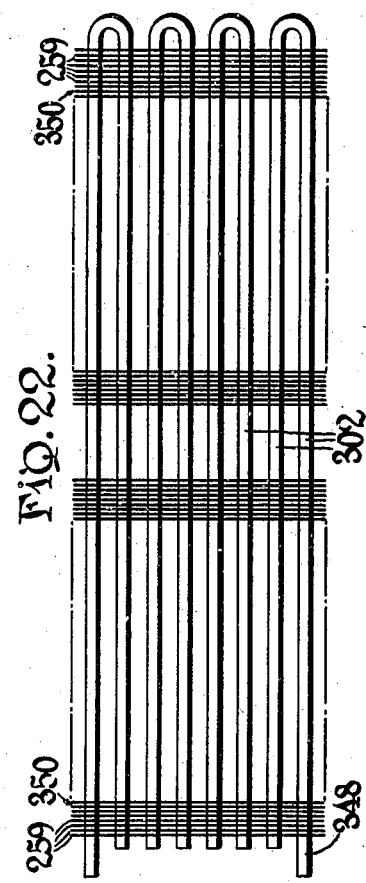
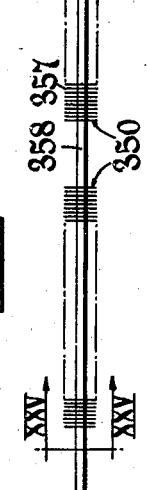
Inventor
Hyla F. Maynes,
Beau, Brooks, Buckley & Beau.
Attorneys May 2, 1939.  H. F. MAYNES  2,156,538
METHOD OF MAKING HEAT TRANSFER UNITS
Filed July 22, 1936  9 Sheets-Sheet 8
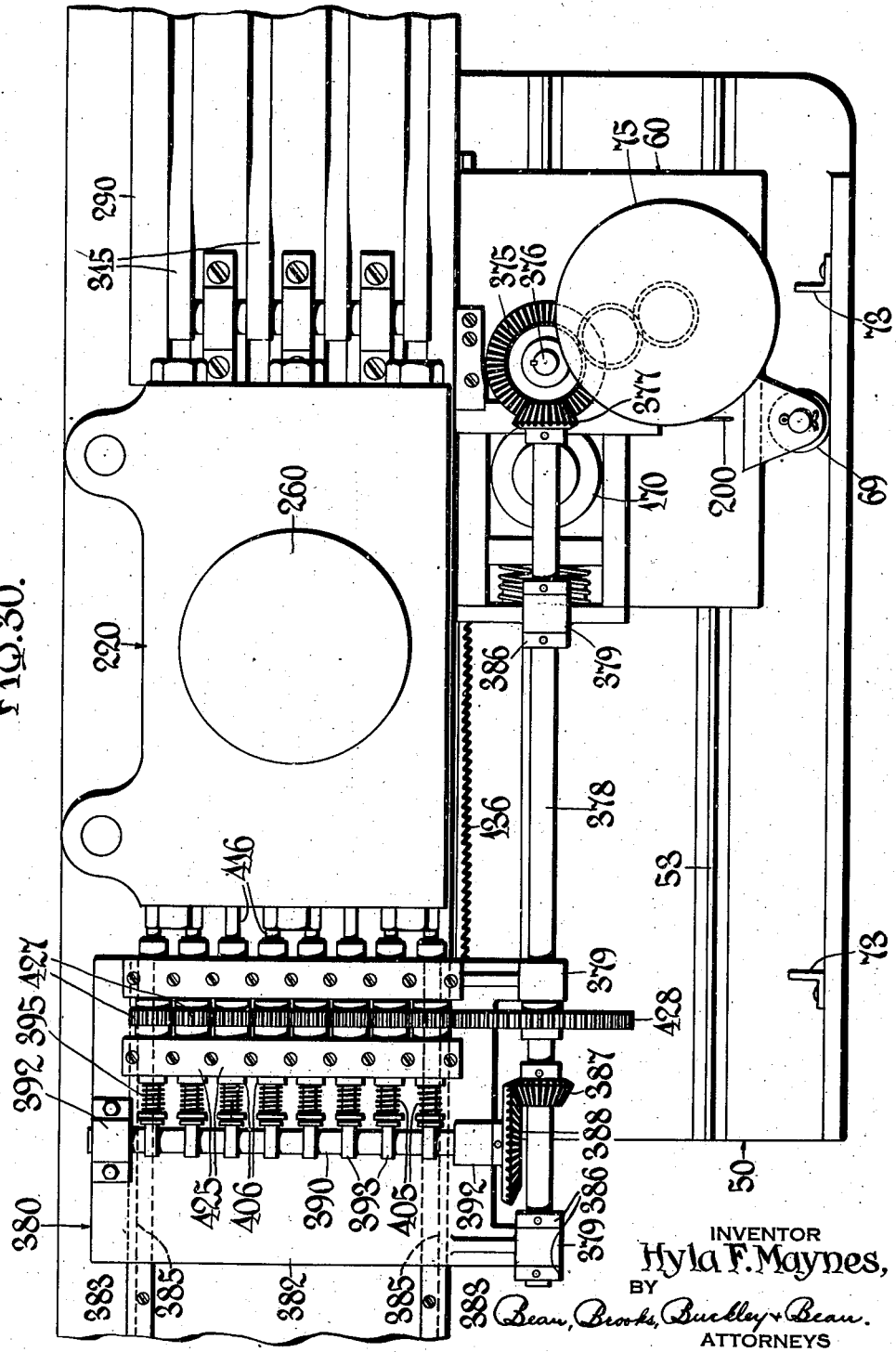

May 2, 1939. H. F. MAYNES 2,156,538
METHOD OF MAKING HEAT TRANSFER UNITS
Filed July 22, 1936 9 Sheets-Sheet 9
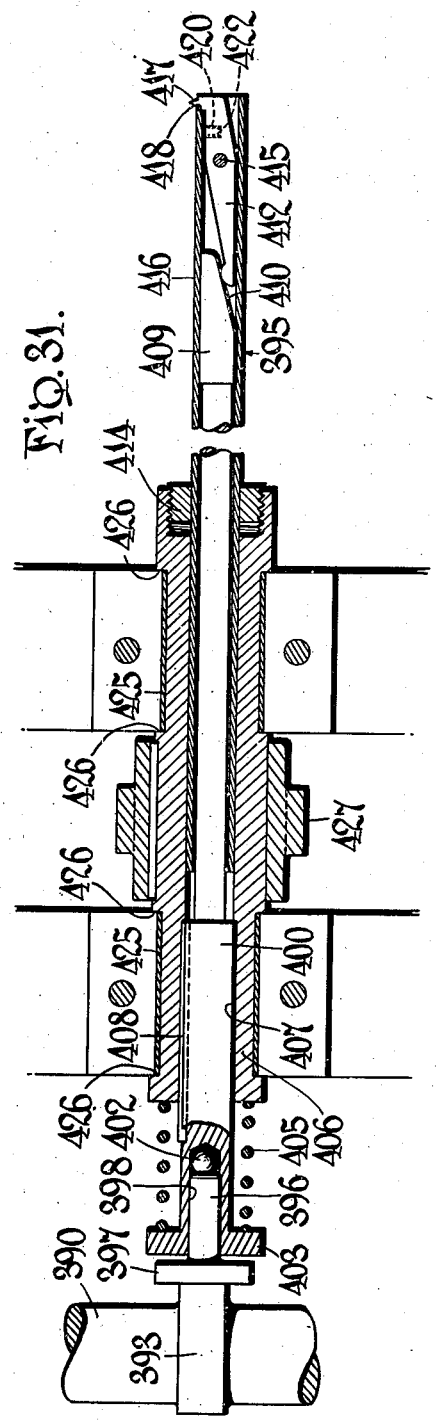
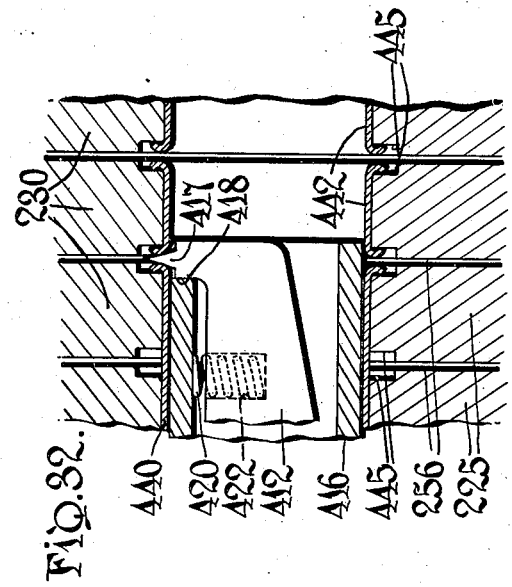
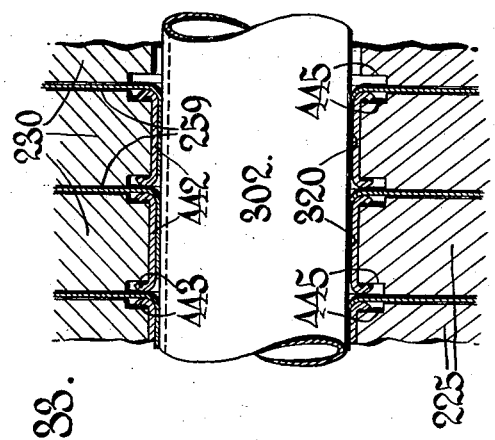
INVENTOR
Hyla F. Maynes,
BY
Beau, Brooks, Buckley & Beau.
ATTORNEYS Patented May 2, 1939

2,156,538

UNITED STATES PATENT OFFICE 2,156,538

METHOD OF MAKING HEAT TRANSFER UNITS

Hyla F. Maynes, North Tonawanda, N. Y., assignor of one-half to Emma C. Maynes, North Tonawanda, N. Y.

Application July 22, 1936, Serial No. 91,950

16 Claims. (Cl. 113—118)

This invention relates to the manufacture of heat transfer units and it has particular relation to a method and machine for assembling elements of a heat transfer unit.

This application is a continuation in part of my Patent No. 2,057,244, dated October 13, 1936, for Machine for and method of making heat transfer units.

One object of the invention is to simplify the operations of assembling elements of heat transfer units and to insure improved positive connection of such elements incidentally to the assembling thereof.

Another object of the invention is to provide an improved method of piercing fins of the heat transfer unit and assembling them with pipe sections in a single operation.

Another object of the invention is to provide an improved strip feeding and cutting device which automatically supplies strip or fin sections to a strip holding jig and severs them to proper lengths, whereby they are in such position as to be pierced and secured to pipe sections.

Another object of the invention is to provide an improved construction of jig cooperable with a strip feeding device for automatically feeding strip material into the jig and cutting such material to predetermined lengths.

Another object of the invention is to provide an improved construction of jig in which the fin strips are pierced and positively secured to pipe sections before removal of the assembled unit parts therefrom.

Another object of the invention is to provide a machine in which strip material is intermittently fed to a jig and cut to predetermined lengths and so held in the position corresponding to that occupied while serving as fins for a heat transfer unit that another mechanism of the machine can force pipe sections through the strip material to assemble the unit elements.

Another object of the invention is to provide an improved fin piercing and pipe assembling unit that is adapted to be operated in conjunction with a strip holding jig and with a strip feeding device.

Another object of the invention is to provide an improved fin feeding and cutting device.

In the manufacture of heat transfer units, it has heretofore been the practice to provide dies for forming the unit fins by punching them and cutting them to proper length and then assembling the pipe sections therewith by inserting the latter through the punched openings of the fins. Also, certain types of heat transfer units are formed by making each fin in two parts which are brought into edge to edge relation from opposite directions about the pipe. While these methods can product heat transfer units of satisfactory construction, the operations necessary are tedious and exacting, and difficulty has been encountered in securing the fins positively and evenly to the pipes until they can be dipped into metal solution or solder, which then provides the proper connection between pipes and fins.

According to this invention a jig is provided which is provided with openings or guides that are adapted to receive strip material to form the unit fins, and the jig is divided into two sections in such manner that the guides traverse both sections and a fin section in one of the guides lies substantially equally in each section. Transverse openings are formed through the jig along the location of the plane dividing the jig into sections and corresponding to the position of the pipe sections in assembled relation to the fins and pipes. The fins in the guides also are held in the jig in the parallel relation they assume in the assembled heat transfer unit.

Mechanism is provided which measures the strip material into proper lengths and severs the material accordingly as it is fed into the several guides of the jig. Pipe guiding and actuating mechanism is arranged adjacent the jig and has guiding members registering with openings through the jig for the purpose of forcing the pipes through the jig openings and through the fins held therein. In order to facilitate the forcing of the pipes through the fins, rods having sharpened heads are disposed in the pipe sections, and these rods, together with other guiding means prevent the pipes from buckling or becoming disaligned while being forced through the jig openings and fins. The jig is so constructed that the sections thereof can be brought almost together and then stopped. In this position of the jig sections the fins and pipes are fed thereto. Then the sections are manipulated to release stops so as to permit the sections to be pressed together with the assembled fins and strip material therein. This action provides for crimping of the fins to the pipes, where they are held in positive assembled relation. The sections of the jig can then be separated and the assembled pipes and fins removed therefrom. Other mechanical beading and crimping elements can be installed in the jig without employing the stops and in such event the jig sections are initially forced entirely together or into fully closed position.

Strip material constituting fins of the unit can be applied to the circulation conduits of a heat transfer unit by inserting relatively thin tubes in the jig, and after the latter has been closed, the tubes are cut into a series of rings. The jig remains clamped about the rings and then fin strips are inserted in such manner that the rings register at locations for the connection of the fin strips to the conduits. Piercing elements pass through the rings and are forced through the fin strips to form on the latter somewhat uneven flanges which are thus surrounded snugly by the individual rings. The forced out flanges will thus be obscured by the rings and, at the same time, the rings serve to hold the fin strips and conduits in assembled relation until they can be treated for permanent assembly.

The thin tubing from which the rings are cut can be severed by sawing through the slotted portions of the jig, or cutting elements can be inserted inside the tubing and the cutting action achieved outwardly from the interior. This latter method of severing provides slight circumferential ring projections which assist in maintaining the rings in proper position in the jig after they have been formed and before the fin strips have been pierced.

After the sections have been separated and the assembled fins and pipes removed therefrom, end plates and end sections of the pipes can be applied. It is then customary to dip the assembled structure in a sealing solution that further secures the fins to the pipes and provides the desired finish to the product. This solution can be of tin or other material conventionally employed for this purpose.

In the drawings:

Fig. 1 is a fragmentary plan of a machine for cutting fin strips and assembling them with pipe elements according to the invention;

Fig. 2 is a fragmentary side elevation of the machine shown in Fig. 1;

Fig. 3 is a fragmentary plan, on a larger scale, of a portion of the machine and illustrating the relationship of a strip piercing and cutting device to a strip receiving jig from which the upper section has been omitted;

Fig. 4 is a bottom plan of a strip feeding and cutting device incorporated in the machine;

Fig. 5 is a fragmentary vertical section, on a larger scale, taken substantially along the line V—V of Fig. 3;

Fig. 6 is a diagrammatic bottom plan of strip feeding rollers and associated elements of the machine;

Fig. 7 is a diagrammatic bottom plan similar to Fig. 6 and illustrating another position of the strip feeding rollers;

Fig. 8 is a fragmentary vertical section taken substantially along the line VIII—VIII of Fig. 1;

Fig. 9 is a perspective, on a larger scale, of blocks or frames for holding a strip cutter and for guiding strip material;

Fig. 10 is a perspective of a heat exchange unit which is a product of the machine shown in Fig. 1;

Fig. 11 is a fragmentary vertical section, on a larger scale, taken substantially along the line X—X of Fig. 3; and illustrating other structure beyond the section line;

Fig. 12 is a fragmentary plan of a pipe section with piercing elements therein associated with a portion of an actuating device;

Fig. 13 is a fragmentary side elevation of the structure shown in Fig. 12;

Fig. 14 is a fragmentary side elevation, on a larger scale, of an end portion of one of the piercing elements;

Fig. 15 is a fragmentary perspective of upper and lower plates which are recessed to form strip receiving slots;

Fig. 16 is a fragmentary vertical section, on a larger scale, taken substantially along the line XVI—XVI of Fig. 8 and illustrating a structure for securing a pipe to a fin strip of a heat exchange unit;

Fig. 17 is a fragmentary side view partially in section and taken substantially along the line XVII—XVII of Fig. 16;

Fig. 18 is a fragmentary vertical section similar to Fig. 17 and illustrating another arrangement for securing a pipe to a fin strip;

Fig. 19 is a fragmentary side view partially in section and taken substantially along the line XIX—XIX of Fig. 18;

Fig. 20 is a diagrammatic plan illustrating the association of a series of heat exchange pipes with a series of strip fins to be connected thereto;

Fig. 21 is a diagrammatic plan illustrating assembled relationship between fins and pipes of a heat exchange unit;

Fig. 22 is a diagrammatic plan illustrating the manner in which a plurality of groups of fins can be assembled with pipes for a heat exchange unit;

Fig. 23 is a side elevation of the structure shown in Fig. 22 after the pipes have been bent to bring the fin groups into juxtaposition;

Fig. 24 is a diagrammatic side elevation of a relatively long pipe section upon which spaced groups of fins can be attached according to the invention;

Fig. 25 is a cross section taken substantially along the line XXV—XXV of Fig. 24;

Fig. 26 is a diagrammatic side elevation of the structure shown in Fig. 24 after the pipe has been bent between adjacent groups of fins to form parallel groups of fins and pipe sections between the several bent portions;

Fig. 27 is a cross section, on a larger scale, taken substantially along the line XXVII—XXVII of Fig. 1;

Fig. 28 is a fragmentary bottom plan illustrating an automatically operable latch for controlling the carriage;

Fig. 29 is a fragmentary side elevation of the structure shown in Fig. 28.

Fig. 30 is a plan of a portion of the apparatus shown in Fig. 1, together with an additional structure for operating in conjunction with a strip feeding device to form rings in which flanges of the fin strip are secured;

Fig. 31 is a fragmentary longitudinal section of a cutting device for severing rings from tubular material;

Fig. 32 is a fragmentary vertical section, on a larger scale, illustrating the manner of cutting rings from tubular material;

Fig. 33 is a fragmentary vertical section, on a larger scale, showing in detail the manner of assembling rings and strip fins with a pipe section of a heat transfer unit; and Fig. 34 is a fragmentary elevation of jig plates in which the opposed edges are formed with interfitting saw tooth elements.

In practicing the invention, a supporting frame 50 of suitable material, such as metal, is provided with a platform 52 having rails or tracks 53 formed thereon. These tracks are V-shape in cross section and carry wheels or rollers 55 thereon of a traveling strip feeding and cutting device 60 which is in carriage form. The circumferential portions of the wheels have V-shaped grooves 62 therein that correspond substantially to the shape of the tracks and serve to guide the carriage 60 in a predetermined path of movement and to prevent lateral displacement thereof. Suitable axles 63 are rotatably mounted in bearing lugs or brackets 65 provided on a horizontal body or frame plate 66 of the carriage.

A vertical flange 67 formed rigidly upon the outer side of the platform 52 is disposed parallel to the tracks 53 and is provided with a track 68 upon which a roller 69 is disposed for horizontal movement and for rotation about a vertical axis. A portion of the carriage frame plate 66 is extended and is in the form of a bifurcated bearing lug 70 which supports a vertical pin 72 upon which the roller 69 is mounted for rotation. This roller 69 and flange 67 prevent lateral tilting of the carriage upon the tracks 53. Suitable stops 73 (Fig. 3) formed on the flange 67 in the path of the roller 69 limit movement of the carriage in opposite directions.

A suitable source of power, such as an electric motor 75 is bolted, as indicated at 76, to the frame plate 66 in such position that it operates about a vertical axis, and is provided with a suitable reduction gear housing 77 in which conventional reduction gearing (not shown) is encased. A driving shaft 80 of the reduction gearing rotates in a bearing 82 formed in the frame plate 66 and rigidly supports a gear 83 which meshes with a second gear 85 carried rigidly upon a vertical shaft 86. A bearing 87 that forms a part of, and extends through, the frame plate 66 carries the shaft 86. The second gear 85 engages a larger gear 88 which is rigidly carried upon a lower portion of a vertical shaft 89 mounted in a bearing 90 similar to the bearing 87 and formed in substantially the same manner in the plate 66.

A cam or actuating disk 100 is rigidly secured to the lower end portion of the shaft 89 immediately above the gear 88 and is provided with a roller 102 mounted for rotation about a vertical axis upon a vertical pin 103 that is carried in the disk adjacent its periphery. A recess 105 formed in the circumferential portion of the disk 100 is so positioned that the roller projects from the disk edge and is between the planes of the opposite sides of the disk.

As the shaft 89 rotates the roller 102 has an intermittent camming action upon a dog or ratchet lever 106, one end portion of which has a slot 107 formed longitudinally therein for receiving a bolt 108 upon which the lever is pivotally supported, as well as having limited longitudinal bodily movement provided by the slot. The bolt 108 is rigidly secured in the frame plate 66, and the lever 106 is pivotal in substantially a horizontal plane. A U-shaped leaf spring 109 has one end connected to the bolt 108 and its other end connected in a notch 110 formed in the ratchet lever. The spring is constantly under tension and urges the lever longitudinally in a direction away from the bolt 108.

A coil spring 112 has an end connection 113 with the ratchet lever 106 adjacent the outer end of the latter and has an opposite end connection 115 with the frame plate 66. This spring 112 is constantly under tension and tends to pivot the lever 106 in a clockwise direction, as viewed in Fig. 4. A stop lug or pin 116 is rigidly carried upon the lower side of the frame plate 66 adjacent the outer end of the ratchet lever 106 and limits movement of the latter in its pivotal movement in the clockwise direction mentioned. The outer end of the ratchet lever is in the form of an inclined tooth 118 which normally engages teeth 119 of a ratchet bar 120 carried rigidly upon an upright stationary wall 122 of the machine frame 50. The ratchet bar 120 is parallel to the tracks 53.

Upon rotation of the disk 100 the camming roller 102 strikes the ratchet lever 106 and pivots it a predetermined degree in a counterclockwise direction, as viewed in Fig. 4. Since the teeth of the ratchet bar 102 are stationary the carriage 60 is moved at intervals upon rotation of the disk 100. As soon as the camming roller 102 is moved away from the ratchet lever the tension spring 112 draws such lever again to its position against the stop 116. During this movement the slot 107 permits longitudinal movement of the lever as its inclined end tooth 118 slides over the inclined surfaces defining the teeth 119 of the ratchet bar 120. The carriage can thus be successively moved at intervals and the lever tooth 118 locks successively behind the teeth 119 of the stationary ratchet bar.

The disk 100 is also provided with a camming lug or pin 125 rigidly carried thereby and disposed in a plane offset from the plane of the roller 102. One end of a lever 126 is in the form of a cam 127 which is disposed in the path of the lug 125 and, by operation of the latter, is intermittently pivoted a predeterminated degree during each revolution of the disk 100. The lever 126 has an intermediate pivotal support 128 carried upon a bracket 129 that is rigidly secured to the frame plate 66. The end of the lever opposite the cam end 127 is provided with a dog 130 pivoted thereto, as indicated at 132, and having an end tooth 133 for engaging teeth 135 of a ratchet bar 136 similar and parallel to the ratchet bar 120, as well as being rigidly connected in the same manner to the wall 122 of the machine frame. A guide 137, carried rigidly upon the frame plate 66 slidably receives the dog 130 and a coil spring 139 having an end connection 140 securing it to the lever, also has a similar opposite end connection 142 securing it to the frame plate 66. This spring is constantly under tension and urges the dog 130 into engagement with the teeth 135 of the ratchet bar by pivoting the lever 126 in a counterclockwise direction, as viewed in Fig. 4.

During each revolution of the disk 100 the lug 125, in a camming action, strikes the cam end 127 of the lever and pivots the latter against the tension of the spring 112 to disengage the dog 130 from the teeth 135.

The cam roller 102 and lug 125 are so related and timed with respect to the levers 106 and 126, respectively, that the dog 130 is disengaged from the teeth 135 momentarily before the roller 102 actuates the lever 106, and while the dog is so disengaged, the lever 106 is operated by the roller 102.

It will be observed that the ratcheting action upon the ratchet bars 120 and 136 is in opposite directions and, hence during intervals between actuation of the levers 106 and 126, the ratchet bars are positively engaged by action of the levers to hold the carriage 60 firmly in a stationary position upon the tracks 53. This action continues until the end of a cycle of movement of the carriage.

When the carriage approaches the ends of the tracks, that is, in its movement to the left, as viewed in Fig. 11, the inclined portion of end tooth 118 of the lever 106 rides upon a cam surface 145 (Fig. 28) which is a continuation of one of the ratchet teeth 119. The lever 106 is thus moved inwardly in a longitudinal direction toward its pivotal connection a greater distance than the normal distance it is moved by sliding over the teeth 119. The slot 107 is sufficiently long to permit this additional movement.

One end of a latch 146 has a pivotal connection 147 upon the stop 116 and is provided with an offset dog or arm 148 which normally impinges upon an edge of the lever 106. As the end of the lever 106 rides upon the cam surface 145 the dog 148 snaps into a notch 150 formed in the lever and locks the latter in a withdrawn position. A spring 152 having one end anchored in the stop 116, as indicated at 153, and providing means for preventing the latch from being displaced from its connection to the stop, has an opposite end portion 155 engaging an intermediate portion of the latch 146 and constantly urges the latter in a direction of engagement with the notch. This action of locking the lever 106 in a withdrawn position is automatic and occurs incidental to the travel of the carriage in one direction.

While the lever is held in locked position (Fig. 28), the carriage can be moved to a starting point adjacent the other end of the tracks 53, or at any place between its maximum limits of movement, and as the carriage approaches such starting position, an outer end portion 156 of the latch strikes a cam member 157 secured to the frame 50 adjacent the end of the ratchet bar. This action pivots the latch out of engagement with the notched portion of the lever and against the force exerted by the spring 152. The leaf spring 109 then urges the lever back to its operative position for engaging the teeth 119 in the manner previously described. After a cycle of operation commences, the end 156 of the latch is automatically disengaged from the cam member by sliding therefrom, and the dog 148 again rests against the edge of the lever 106.

It is to be understood that the cam member 157 can be connected at any of various positions within the path of movement of the latch and the position of the cam surface can be varied according to the distance it is desired that the carriage should travel.

A roller body 160 (Figs. 8 and 11) is carried rigidly upon the upper end portion of the shaft 89 and is provided with a circumferential channel 162 dividing the body into an upper roller section 165 and a lower roller section 166. It is to be understood that the roller sections can be constructed as separate elements and assembled into substantially the form shown. The lower roller section 166 circumferentially engages a disk-like cam section 167 of a roller body 170 that is also provided with an upper roller section 172 likewise normally engaging, or contiguous to, the upper roller section 165. A cam lug 173 (Fig. 6) is formed upon the circumferential edge of the lower cam disk or roller section 166. A groove or channel 175 registering or in alinement with the channel 162 is formed between the upper roller section 172 and cam disk 167. For purposes of convenience the upper roller sections 165 and 172 are designated as feed rollers.

The roller body 170 is rotatably carried upon an upright bearing shaft 176 that is rigidly secured adjacent its lower end in a slide 177 that is directed horizontally toward and away from the shaft 89 in guides 178 (Fig. 4) formed in the upper surface of the frame plate 66. An opening 180 also formed in the plate receives the lower end of the shaft 176 and provides for movement therein as the slide is actuated. Fastening elements 182 connected in the upper ends of the shafts 89 and 176 prevent accidental axial displacement of the roller bodies 160 and 170 from these shafts.

One extremity of the slide 177 is provided with sockets 185 for receiving adjacent end portions of compression springs 186 and the other end portions of these springs are mounted upon lugs 187 provided rigidly upon a plate 188 that is integrally formed on, or is rigidly secured in an upright position along, one edge or end of the frame plate 66. The springs 186 are constantly under compression and urge the roller body 170 toward the roller body 160.

An upright guide wall 190 (Figs. 8 and 9) is rigidly mounted upon the upper side of the carriage frame plate 66 and is located substantially midway between the shafts 89 and 176 when the peripheries of the feed rollers are in contact with each other. Openings 192 and 193 are formed transversely through the wall in which roller sections 166—167 and feed rollers 165—172 are disposed, and a guideway 195 is formed in the wall in such position that a strip of material 200 fed through the guideway is clamped and held between the feed rollers. The grooves 162 and 175 provide space for receiving an intermediate portion 202 of the wall in which the lower extremity of the guideway is formed. The strip of material is gripped between the feed rollers as they are rotated and in each revolution of these rollers the cam lug 173 strikes the roller section 167 and momentarily separates the feed rollers. The strip material can be supplied from a conventional reel (not shown) upon which the material can be wound.

The operation of the cam lug 173 in separating the feed rollers is so timed that the rollers are separated during the period in which the cam roller 102 operates the ratchet lever 106 and while the dog 130 is disengaged from the ratchet bar 136.

A cutter holder 204 is rigidly secured to the upper side of the frame plate 66 adjacent the edge thereof opposite the roller 69, and is in the form of a rectangular block of metal (Figs. 4 and 9). A vertical groove 206 formed in the outer side of the holder receives a flange 207 formed on the rear end of a cutter 205 and in such relation that the cutter can pivot outwardly about the connection of the flange in the vertical slot although the pivotal action is very slight. A portion of the outer face of the holder is cut away to form a shoulder 208 upon which the lower edge of the cutter rests. The cutter is provided with a vertical cutting edge 209 adjacent the exit of the guide 195 and a pair of coil springs 210 normally under compression are disposed in sockets 212 formed in the holder 204 and their outer ends impinge upon the inner side of the cutter. A cover plate 215 (Fig. 3) is secured along the upper edge of the holder 204 by means of fastening elements 216 to prevent the cutter from being displaced from the holder.

A jig 220 mounted upon a horizontal platform 222 (Figs. 8 and 15) of the machine frame 50 comprises a series of lower plates 225 disposed on edge and side by side in such relation that their inner end edges are substantially coincidental with the path of movement of the cutter 205 as the carriage 60 travels upon the tracks 53. Suitable bolts or rods 226 extending through openings 227 in the plates and through ears 228 formed integrally on the frame 50, rigidly hold the plates in a stationary position.

An upper group of plates 230 arranged similarly to the plates 225 and in edge to edge relation thereto in a closed position of the parts of the jig 220 is provided with bolts or rods 232 extending through openings 233 in the upper plates and through ears 235 formed upon an upper horizontal plate holder 236 for the purpose of rigidly assembling the plates 230 with the holder. Guiding posts 238 extending rigidly from the holder in a downward direction have their lower ends disposed in guides 239 formed in the platform 222 of the machine frame and insure proper alining of the several lower and upper plates 225 and 230 in edge to edge relation when they are moved toward one another.

As best shown in Figs. 8, 11 and 15, each lower plate 225 is so formed as to have an upper relatively thin section 240 which is defined by shoulders 242, and the inner end of the plate is provided with an upright guard 243 having the same width as the thinner section 240. Substantially semi-circular notches 245 are formed in regularly spaced relation along the upper margin of the narrower section 240.

Likewise, each upper plate 230 is so formed as to have a lower relatively thin section 250 which is defined by shoulders 252, and the inner end of the plate is adapted to fit closely adjacent the inner surface of the upright guard 243 of the lower companion plate 225. Substantially semicircular notches 255 are formed in regularly spaced relation along the lower margin of the thinner section 250 and these notches are registrable with the similar notches 245 of the lower plate to define transverse substantially circular openings when companion plates 225 and 230 have been moved together in opposed edge to edge relation and into approximate contact.

In Fig. 34, there is shown a different edge formation of the lower and upper plates 225 and 230 in that the opposed edges of the plates are of substantially saw-tooth form and interfit in staggered relation. The recesses 245, 255 are disposed alternately at the staggered portions of the saw tooth edge and hence, are also arranged in staggered relation. In assembling pipes 302 into the jig elements modified in this manner, the position of the guides for moving the pipes into assembled position can be altered according to the path in which the pipes are inserted into the jig.

After the plates 225 and 230 have been brought together in the relation shown in Fig. 11 the thinner sections 240 and 250, together with the shoulders 242 and 252, define a series of slots 256 into which the strip 200 is to be fed. The plates 225 and 230 are of such length that one revolution of the feed rollers feeds a section of the strip into one of the slots 256 a distance substantially equal to the circumference of one of the rollers minus the space required for the operation of the cam 173 that releases the strip from the grip of the feed rollers. The distance between the several slots 256 corresponds to the distance between the teeth 119 or 135 of the ratchet bars 120 and 136. Each time the carriage 60 is released and moved by operation of the levers 106 and 126, the cutter edge 209 severs the strip 200 by a shearing action in cooperation with an end corner 258 of one of the plates 225. Each upright guard defines a portion of the corner 258 and thus there is provided a continuous corner against which the entire width of the strip is pressed during each cutting operation. This operation is continued intermittently until as many of the slots 256 as desired are filled with sections or fins 259 of the severed strip. A stop strip or bar 257 rigidly secured along one side of the jig across the outer ends of the slots 256 prevents the strip sections from being disposed too far through the jig or from being accidentally displaced therefrom.

In the position of the jig parts as shown in Fig. 8, wherein the strip sections are fed into the slots 256 and cut to proper length, the contiguous edges of the companion plates 225 and 230 are not, in this phase of the operation, brought entirely into contact with one another, but sufficient space remains for additional later movement.

A piston and cylinder device 260 of conventional construction is operated by fluid pressure and is connected to the upper holder 236 of the jig by means of an actuating piston 262 of the device 260 to move the group of upper plates 230 toward or away from the lower plates. The piston and cylinder device 260 is carried upon a suitable stationary support 265. In order to gauge the plates so as to provide the slightly spaced relation between their edges, a portion of one or more of the upright guides 238 is formed with a recess 266 which defines a shoulder 267 and one end 268 of a lever 269 is engageable with the shoulder to provide a stop to arrest the downward movement of the plates 230. The lever 269 is pivoted upon a bolt 270 carried rigidly in the machine frame platform 222. A stop 272 (Fig. 3) provided in the platform adjacent the lever 269 is disposed in such position that, by pivoting the lever thereagainst, the latter is so positioned that its end will be disposed along the recessed portion of the guide post and will stop the latter by engagement with the shoulder 267. When further movement of the upper plates is desired the lever can be pivoted out of engagement with the guide post and then the edges of the upper and lower plates can be brought together by the pressure device. The purpose of this particular operation appears in the description to follow.

A strip piercing and pipe positioning device 280 is disposed adjacent the construction just described and is provided with a supporting platform 282 that forms a part of the main frame 50. Along the outer extremity of the platform 282 a piston and cylinder actuating device 283 of conventional form is rigidly mounted and has a pivotal connection 285 to a cross head 286 that is slidably mounted in guides 287 formed in the frame.

An actuating frame 288 has a pivotal connection 289 with the cross head 286 and includes a series of bars 290 rigidly assembled by means of strips 292 bolted, or similarly secured, transversely thereof. This frame can be pivoted to an inoperative position indicated by broken lines of Fig. 2. Each of the bars 290 is provided with opposite laterally projecting slide members 293 and opposite upper and lower slide members 295 which impart a cross like cross sectional configuration (Fig. 27) to each bar.

Pairs of parallel channel guideways 296 formed in guide bars 297 slidably receive the slide members 293 of the bars and these guide bars are secured upon the platform 282 to form a guide frame 298. The upper surface of each upper slide member 290 is disposed snugly between opposed upper edges of the channel bars 297.

Thus the actuating frame 288 is adapted to be slidably moved into interfitting relation with the guiding frame 298.

The end of each bar 290 (Fig. 12) is provided with a recess 299 that corresponds substantially in shape to the bight portion 300 of a pipe section 302 that has been bent to provide two parallel leg portions 303 joined by the bight. Rods 305 are inserted into the parallel leg portions 303 of the pipe section and shoulders 306 formed adjacent the outer end portions of the rods abut against the outer ends of such leg portions. Fin piercing heads 308 are provided integrally upon the ends of the rods and are slightly larger in diameter than the diameter of the pipe. A series of blades 309 are formed longitudinally of each rod upon a pointed or conical end surface 310 of the head. These blades are spaced substantially uniformly about the circumference of the conical end.

A series of pipes 302 with the rods 305 disposed therein in the manner shown in Fig. 12 are then inserted into the guideways 296, while the actuating frame is in the broken line position shown in Fig. 2. After the guide frame 298 has been filled with pipe sections having piercing rods disposed therein in the manner shown in Figs. 1 and 12, the frame 288 is pivoted to approximately the full line position shown in Fig. 2 and, in this position, the recesses 299 in the ends of the bars 290 are aligned with the bight portions 300 of the pipe sections. Then the cross head 286 is actuated by the fluid pressure device to move the pipe sections longitudinally through the guide frame 298. During this movement the channel guideways 296, together with the rods 305 in the pipes, prevent displacement or buckling of the latter.

A series of arcuate bars 315 is pivotally mounted upon a hinge pin 316 mounted transversely in ears 317 of the end portion of the guide frame opposite the frame 288 and these bars have their intermediate portions curved downwardly to lie between the several channel members 297 and between the parallel leg portions of each pipe section. In the position of the elements shown in Fig. 2 the outer end portion of each arcuate bar 315 rests upon the end of the adjacent bar 290 and as the latter bar is moved inwardly it imparts a camming action to the arcuate bar to move or raise it gradually from between the pipe sections. This arrangement provides for additional guard against buckling of the pipe sections.

The guide frame 298 is so positioned with respect to the jig 220 that the channel guideways 296, and hence, the leg portions of the pipe sections disposed therein register, or are aligned with, the openings formed by the recesses 245 and 255 in the plates 225 and 230. After a series of strip sections have been inserted in the slots 256 of the jig by operation of the feeding and cutting device 60 and the parts of the jig are in substantially the relation shown in Fig. 8, the fluid pressure device 283 is operated to force the pointed heads 308 of the piercing rods carried in the pipe sections in such manner as to pierce the strip sections and until the pipe sections are disposed therethrough in the manner shown in Fig. 21. This operation is facilitated by the blades 309 formed on the pointed end surface of the rod heads.

As best shown in Figs. 16 and 17, the metal at the location of the openings formed by the piercing rods is forced aside to form flanges 320 that are then disposed between the outer surface of the pipes and the inner circumferential surfaces defining the openings 245 and 255. Then the lever 269 is actuated to release the guiding posts 238 and additional pressure applied to the upper section of the jig 220 by the fluid pressure device 260 to move the upper and lower plates together in opposed relation. This action slightly indents the metal of the pipes, as indicated at 322, and provides a positive connection between each pipe section and the strip fins 259. The fins are thus crimped to the pipe sections. The piercing rods are withdrawn from the pipes before the jig is opened and then the upper section of the jig, including the plates 230, is withdrawn to permit removal of the assembled fins and pipes which can be lifted bodily from the jig.

It is to be understood that the assembled fins and pipes can be subjected to further treatment, such as dipping in solution that will further seal and secure the fins to the pipe.

Another arrangement for positively securing the fins to the pipe sections before opening the jig 220 includes a pair of sliding punches 325 disposed in guides 326 formed in each opposed pair of plates 225 and 230 and these punches 25 are movable toward and away from the flanges 320 that are upset from the fins 259. An eccentric opening 327 is formed in the outer end of each punch and receives a cam rod 328 that also has an eccentric portion or cam 329 disposed in the opening. Upon rotation of the cam rod in openings 330 formed through the plates 225 and 230, each punch 325 is forced toward the fin flange 320 and projections 332 formed on the inner end of each punch slightly upset the metal of the fin and pipe to form crimped or beaded sections 333 that provide for positive connection of the fins to the pipes.

Each cam rod 328 is provided with a lever 335 pivotally connected in parallelism by means of linkage 336 to the adjacent lever 335 and one of the levers is provided with an actuating handle 340 by which the cam rods can be rotated concurrently to perform the operation just described. In this arrangement the plates can be brought to such position as to have their opposed edges in substantial contact and then the stop lever 269 and shoulder 267 of the guide post will not be necessary. It is to be understood that in such case the openings or recesses 245 and 255 are formed of such size that there will be sufficient clearance between the pipe sections 302 and plates at the openings to permit formation of the fin flanges 320 before the pipes and fins are beaded together.

After the piercing rods 305 have been withdrawn from the pipe sections and the assembled fins and pipes have been removed from the jig, end plates 342 are applied to the pipes to protect the outer fins and to strengthen the assembly. These plates can be suitably punched or slotted, as indicated at 343, to receive the pipe sections 305 and are then soldered, or otherwise secured rigidly to the pipe sections.

In order to provide continuous sinuous piping, U-shaped bight sections 345 are secured to the ends of the pipe sections 302 in alternate relation to the bight portions 300 of the original pipe sections. It will be noted that the outer pipe sections or legs (Fig. 21) are extended, as indicated at 348, to facilitate connection of the assembly to fluid sources used in operating the heat exchange units.

It is to be understood that the length of the fin strip 259 to be severed can be varied by changing the size of the feed rollers 165 and 172, or by providing a plurality of cam rollers, such as the roller 102, on the cam disk 100, together with a plurality of cam pins, such as the pin 125, and arranged in the same manner to operate the levers 106 and 126 more than once for each revolution of the disk. In like manner, more than one cam corresponding to the cam 173, can be applied to the roller section 167. Since these arrangements appear to be obvious from the disclosure already described, a detailed showing thereof is not necessary.

It may be desirable to feed the strip in such manner as to provide a plurality of groups 350 of fins (Fig. 22) and wherein more than one jig is required, or a more extensive number of plates 225 and 230 arranged in groups may be necessary. In such instance, relatively long sections of pipe 302, like those shown in Fig. 22, can be forced through the several groups of fin sections 259 in substantially the same manner as that previously described. Under such circumstances, the frames 288 and 298 can be made as long as desired and piercing rods 305 commensurate with the length of the pipe sections can be used. The pipe sections after assembly with the fin sections can then be bent, as indicated at 355, to form a unit 356 having a plurality of groups of fins arranged in successive tiers in the manner shown in Fig. 23.

If it is desired to feed the strip 200 in such manner as to provide fin sections 357, each of which traverses only one section of pipe to form an assembly of the kind shown in Figs. 24, 25, and 26, a relatively long section of unbent pipe 358 is provided with a piercing rod 305 of proper length and is forced through sections of fins held in the jig. Under such circumstances, the frames 288 and 298 can be made to accommodate the length of pipe as long as necessary and the operation of the machine proceeds in substantially the same manner as that already described. The jig 220, of course, can be provided with a plurality of groups of plates to accommodate the several groups of fins shown in Figs. 22 and 25. After assembly with the fin sections, the pipe 358 can be bent alternately, as indicated at 359, in opposite directions into the form shown in Fig. 26 wherein the groups 350 are successively disposed on the parallel portions of the bent pipe.

In Figs. 30 to 33, there is shown another arrangement for securing fin strips 259 to the pipe sections 302, and in this form a bevel gear 375 is rigidly secured upon an upper extended portion 376 of the shaft 89 of the carriage 60. A second bevel gear 377 meshes with the gear 375 and is rigidly secured upon an end portion of a horizontal shaft 378 that is rotatably mounted in bearing elements 379 provided rigidly upon the carriage 60 and upon a ring cutting device 380 of carriage form. The latter device includes a carriage platform 382 and is mounted upon guideways 383 provided rigidly upon the frame structure 50 in parallel relation to the tracks 53. Suitable guide members 385 on the carriage platform 382 guide the device 380 upon the guideways 383 toward and away from the jig 220.

An end portion and an intermediate portion of the shaft 378 are provided with collars 386 on opposite sides of certain of the bearing elements 379 in order that the carriages 60 and 380 can move in unison.

A bevel gear 387 mounted rigidly upon the shaft 378 meshes in driving relation with a larger bevel gear 388 that is carried rigidly upon a cam shaft 390 that is mounted in bearing elements 392 formed upon the platform 382, and the latter shaft is provided with a series of cams 393, each of which impinges upon one end of a rotatable cutting device 395 for actuating the latter. The end portion of each cutting device 395 is provided with a plug 396 having a head or annular flange 397 against which the cam impinges, and this plug is axially rotatable in a socket 398 formed axially in a rear portion of a horizontal rod 400. A suitable thrust bearing 402 is located at the inner end of the plug in the socket 398 to minimize friction incidental to the operation of the cams and rod. Each rod 400 has an annular flange 403 formed at its rear portion and upon which one end of a coil compression spring 405 is seated. The other end of the coil spring 405 is seated upon an end portion of a rotatable sleeve 406 having an axial bore 407 in which the rod 400 is axially and slidably keyed, as indicated at 408.

The outer or front end of the rod 400 is provided with an integral head 409 having a beveled face 410 inclined with reference to the rod axis and slidably engageable for camming action upon an end portion of a knife 412, that is pivoted, as indicated at 415, intermediate its ends and on the inside wall of a tube 416 carried rigidly in the sleeve bore 407. A plug 414 through which the tube 416 is disposed is screwthreaded into the outer end of the sleeve 406. An angular blade 417 projects integrally from an outer end of the body of the knife 412 and through a recess 418 formed in the end portion of the tube. Thus it will be apparent that sliding movement of the rod 400 in the bore 407 and in the tube 416 causes the beveled face 410 to have a camming action upon the inner end of the knife 412 and the blade 417 thereof is actuated outwardly in substantially a radial direction through the recess 418 beyond the outer peripheral surface of the tube.

A coil spring 420 carried in a socket 422 formed in the outer end portion of the knife engages under compression the inner surface of the tube 416 constantly exerts pivoting force upon the knife to maintain the blade 417 in a withdrawn position inside the boundaries of the tube 416 when the camming face 410 is withdrawn rearwardly from the position shown in Fig. 31.

Bearings elements 425 are provided on the carriage platform 382 for rotatably supporting each sleeve 406, and shoulders 426 formed upon this sleeve prevent axial movement thereof during its rotation. Each sleeve 406 has a gear 427 rigid thereon, and the gears 427 of the several sleeves intermesh successively, while the gear 427 at one extremity of the train of gears meshes with a larger gear 428 rigidly carried upon the shaft 378 that also drives the cam shaft 390.

It is to be understood that the tubes 416 register with the openings through the jig formed by the complemental recesses 245 and 255 provided in the plates of the jig when the latter is in closed position, and that movement of the strip feeding carriage 60 imparts a corresponding movement to the carriage 380, and hence, to the tubes 416. While the jig is in an open position, tubes 440 of thin material are placed in the recesses 245 and their ends should be substantially flush with the opposite extremities of the jig. Then by closing the jig the tubes 440 are clamped therein. In this form of the construction it is to be understood that the recesses 245 and 255 are of such size as to accommodate the tubes 440 which are, in turn, sufficiently large to receive the pipe sections 302 therethrough.

In this arrangement the lever 269 for limiting the closing action of the jig is not employed. By moving the carriages 60 and 380 to the right, as viewed in Fig. 30 the knife supporting tubes 416 are inserted into the ring forming tubes 440 in the jig and the blade 417 of each knife registers with a space between two jig plates into which the strip material 200 is to be inserted.

Before inserting the strip material 200 between the feed rollers 165 and 172, the latter are operated through one revolution or cycle. In this manner the train of gearing from the bevel gear 375 to the gears 427 is rotated and the action of the cam 393 causes the rod 420 to move longitudinally and thus to actuate the blade 417 substantially radially outwardly against the inner periphery of the tube 400 while the knife is rotating for severing the tube 440 to form a ring 442 as illustrated in Figs. 32 and 33.

In forcing the blade 417 substantially radially outwardly, flanges 443 are formed outwardly on the rings 442 and are disposed in recesses 445 which are provided annularly in the edge portions of the jig plates that define the recesses 245 and 255. These flanges 443 engage edge portions of the jig plates and prevent the rings 442 from shifting axially after they have been formed.

At the beginning of the next revolution or cycle of operation of the feed rollers 165 and 172 the strip material 200 is fed thereto, and the rollers then continue feeding the strip material into the jig and severing it in the manner previously described. At the same time, the cam 393 actuates the blade 417 in timed relation with respect to the intermittent movement of the carriages 60 and 380 for successively cutting rings 442 from the tube 40. That is, each cam 393 moves a knife blade outwardly when the latter is in registering relation with one of the strip receiving openings 256. It will be apparent from this description that this ring cutting operation for each cycle of operation of the knife occurs in advance of the strip feeding operation by the feed rollers 165 and 172, all of which continue until the jig 220 has been filled to the desired extent with fin strips 259 inserted between the adjacent rings 442.

After the rings 442 and fin strips 259 have been formed and assembled in the jig, the piercing rods 305 with pipe sections 402 thereon are actuated in the manner previously described to pierce the fin strips and position fluid conducting pipe stock therein.

In this operation the flanges 320, formed as previously described and shown with reference to Figs. 16 to 19, are forced into the rings 442 and the latter cover and surround these flanges to provide a relatively firm assembly of strips 259 and pipe sections 302. This method of assembly also enhances the appearance of the heat transfer unit, as well as providing a novel and efficient reinforced structure.

Although more than one form of invention has been shown and described in detail, it will be apparent to those skilled in the art that the invention is not limited to such forms, but that other structures embodying the invention can be designed from the disclosure without departing from the spirit of the invention or from the scope of the appended claims.

I claim:

1. A method of making heat transfer units which comprises holding a series of plain unpunched fins of strip material in parallel spaced relation, piercing the fins by forcing an assembled unit of pipe sections and piercing means through the several unpunched fins while they are held in such parallel spaced relation to assemble the fins and pipe sections in substantially the relation they assume in their final form in the heat transfer unit, and withdrawing the piercing means from the assembled fins and pipe sections.

2. A method of making heat transfer units which comprises holding a series of plain unpunched fins of strip material in spaced parallel relation, forcing a unit of punching means and pipe sections transversely through said unpunched fins in a substantially continuous operation to assemble the fins and pipe sections in substantially the relation they assume in their final form in the heat transfer unit, and withdrawing the punching means from the assembled fins and pipe sections.

3. A method of making heat transfer units which comprises holding a series of plain unpunched fins of strip material in a jig, piercing the fins and forcing pipe sections transversely through the several fins of the series in a continuous operation to assemble the fins and pipe sections in substantially the relation they assume in their final form in a heat transfer unit, and upsetting and interconnecting contiguous portions of the fins and pipe sections while they are held in the jig.

4. A method of making heat transfer units which comprises holding a series of fins of strip material upon their edges in substantially parallel spaced relation, piercing the fins and forcing pipe sections through the several fins of the series in a continuous operation to assemble the fins and pipe sections in substantially the relation they assume in their final form in a heat transfer unit, and upsetting and interconnecting contiguous portions of the fins and pipe sections after the pipe sections have been forced through the fins.

5. A method of making heat transfer units which comprises cutting unpunched strip material into fin sections of predetermined length, holding the sections in parallel spaced relation to form a group of sections assuming the relative positions they occupy in an assembled heat transfer unit, forcing a unit of piercing means and pipe sections through the group of unpunched fin sections in a continuous operation to assemble the pipe sections therewith, and withdrawing the piercing means from the assembled pipe sections and fin sections.

6. A method of making heat transfer units which comprises cutting strip material into plain unpunched fin sections of predetermined length, holding the sections in a jig in spaced parallel relation to form a group of fin sections assuming the relative positions they occupy in an assembled heat transfer unit, forcing a unit of piercing means and pipe sections through the several unpunched fin sections of the group in a continuous operation to assemble the pipe sections therewith, crimping the fin sections to the pipe sections while they are held in the jig, and withdrawing the piercing means from the assembled pipe sections and fin sections.

7. A method of making heat transfer units which comprises holding a plurality of groups of unpunched fins of sheet material in spaced relation, the fins of all the spaced groups being disposed on their edges and disposed in substantially parallel relation, forcing a pipe section with piercing means thereon progressively through all of the fins of the several spaced groups to assemble the fins and pipe section, and withdrawing the piercing means from the assembled fins and pipe section.

8. A method of making heat transfer units which comprises holding a plurality of groups of unpunched fins of sheet material in spaced relation, the fins of all of the spaced groups being held on their edges and disposed in substantially parallel relation, forcing a pipe section with piercing means thereon progressively through all of the fins of the several spaced groups to assemble the fins and pipe section, bending the pipe sections between the several groups to form parallel groups of fins disposed on parallel sections of pipe, and withdrawing the piercing means from the assembled fins and pipe sections.

9. A method of making heat transfer units which comprises holding a plurality of groups of plain unpunched fins of sheet material in spaced relation, the fins of all of the spaced groups being held on their edges and disposed in substantially parallel relation, piercing the fins and forcing a pipe section progressively through the fins of the several spaced groups of fins, upsetting and interconnecting contiguous portions of the fins and pipe section while held in the relation specified, and bending the pipe sections between the several groups of fins to form parallel groups of fins disposed on parallel sections of pipe.

10. A method of making a fin assembly for heat transfer units which comprises holding a tubular member in predetermined position, severing the tubular member into a plurality of rings, inserting fin strip material between the rings, piercing the fin strip and forcing material of the fin strip at the pierced portion into the rings to be surrounded by the latter.

11. A method of making a fin assembly for heat transfer units which comprises holding a tubular member in predetermined position, severing the tubular member into a plurality of rings, inserting fin strip material between the rings, and punching openings through strip material substantially axially of the rings to force flange portions of the material into snugly fitting relation against inner peripheries of the rings.

12. A method of making a fin assembly for heat transfer units which comprises holding a tubular member in a predetermined position, severing the tubular member from its inside outwardly into a plurality of rings, inserting fin strip material between the rings, piercing the fin strip material and forcing material of the fin strip at the pierced portion into the rings to be surrounded thereby.

13. A method of making a fin assembly for heat transfer units which comprises holding a tubular member in a predetermined position, severing the tubular member into a plurality of rings, upsetting edge portions of the rings to form outwardly extending flanges, inserting fin strip material between the rings, piercing said fin strip material, and forcing material of the fin strip into the rings at the pierced portion to be surrounded by the rings in securing relation.

14. A method of making heat transfer units which comprises holding a tubular member in a predetermined position, severing the tubular member from its inside substantially radially outwardly into a plurality of spaced radially outwardly flanged rings, inserting fin strip material between the rings, forcing material of the fin strip axially into the rings to form flanged openings with the rings surrounding flanged portions of said material, and inserting fluid conducting pipe stock into the openings and rings.

15. A method of making heat transfer units which comprises holding a tubular member in predetermined position, severing the tubular member into a plurality of rings, inserting fin strip material between the rings, and concurrently punching the strip material and forcing fluid conducting pipe stock through the strip material and rings to assemble the rings, strip material and pipe stock in substantially the relation they assume in their final form in a heat transfer unit.

16. A method of making heat transfer units which comprises holding a tubular member in predetermined position in a jig, severing the tubular member into a plurality of rings while held in the jig, inserting a series of fin strips into the jig between the rings, forcing fluid conducting pipe stock with percing means therein through the fin strips and openings to form flanges pressed against the inner peripheries of the rings.

HYLA F. MAYNES.